UNITED STATES PATENT OFFICE.

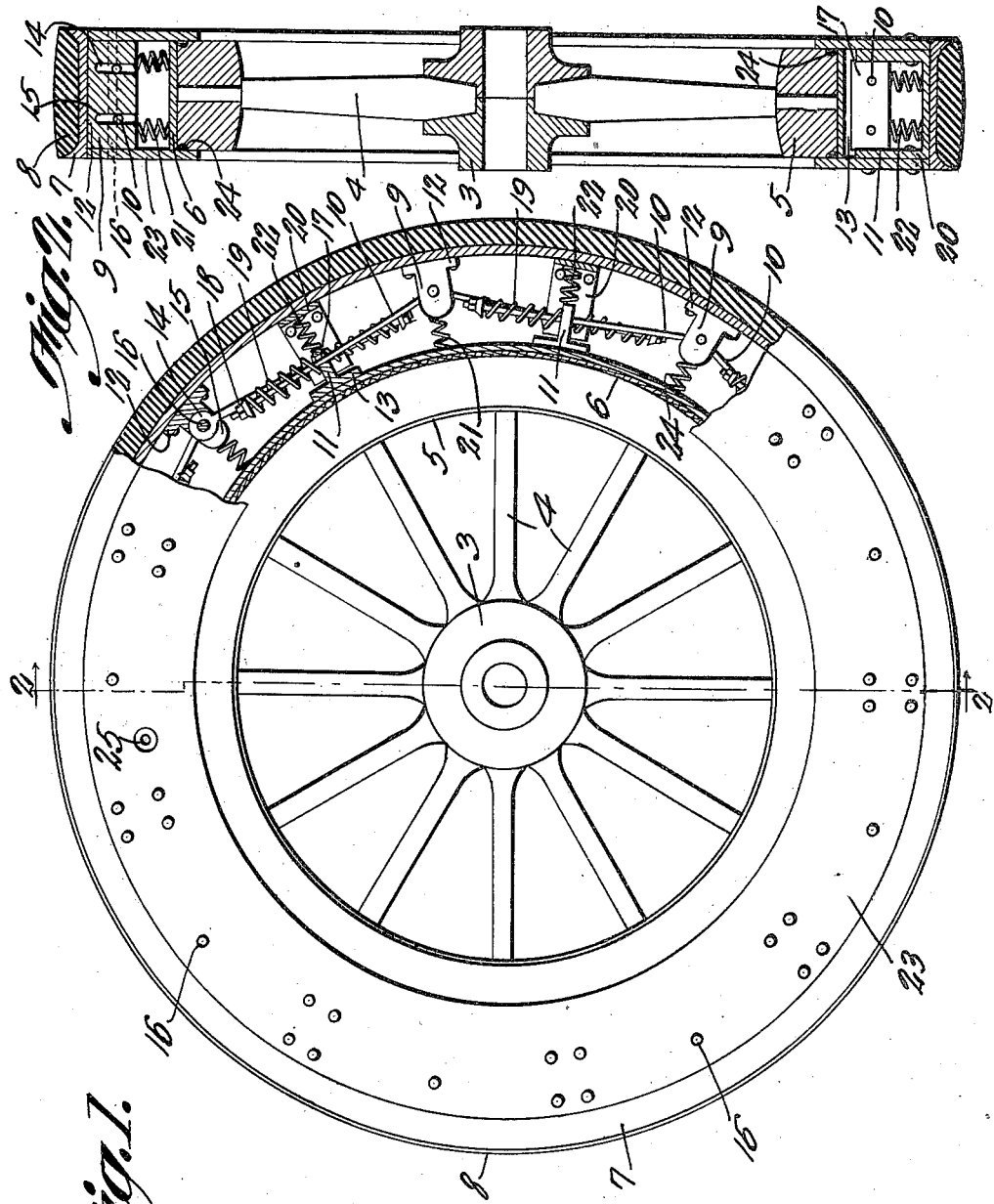

GEORGE W. GRAVES, MOSLEY McCOLLMAN, AND ALEXANDER P. GIBSON, OF ALDERSON, WEST VIRGINIA.

SPRING-WHEEL.

1,093,124.   Specification of Letters Patent.   Patented Apr. 14, 1914.

Application filed March 10, 1913. Serial No. 753,402.

*To all whom it may concern:*

Be it known that we, GEORGE W. GRAVES, MOSLEY McCOLLMAN, and ALEXANDER P. GIBSON, citizens of the United States, residing at Alderson, in the county of Monroe, State of West Virginia, have invented a new and useful Spring-Wheel, of which the following is a specification.

The present invention appertains to vehicle wheels, and aims to provide a novel and improved tire for vehicle wheels, which shall be capable of supplanting the ordinary pneumatic tire, which shall have the good characteristics and qualities of said tires, and which shall also eliminate the objectionable qualities thereof.

It is the object of the present invention to provide a spring wheel, the tire of which is adapted to yield in various directions in the plane of the wheel, so as to give both vertical and oscillatory relief, but which shall not be liable to be displaced laterally, the tire being capable of quick recovery from its various vertical and oscillatory displacements due to the conditions to which the wheel is subject in use.

It is the further object of the present invention to provide in combination with the felly of the wheel, and a tire spaced therefrom, a novel yielding or spring structure between the felly and tire permitting the tire and felly to yield in various directions in the plane of the wheel, in connection with means for closing the space between the felly and tire and for constraining the tire against lateral displacement, and at the same time permitting the tire to yield as above indicated.

With the foregoing general objects outlined, and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing: Figure 1 is a side elevation of a wheel embodying the present invention, parts being broken away, and parts being shown in sections. Fig. 2 is a sectional view taken on the line 2—2 of Fig. 1.

Referring specifically to the drawing, it being understood that this invention is applicable to various vehicle wheels and the like, such as automobile wheels, bicycle and motorcycle wheels, the wheel proper embodies the usual hub 3, the spokes 4 radiating therefrom and the felly 5 secured to the outer ends of the spokes, the particular construction of the same being of no moment. It is preferable to provide a band or rim 6 embracing the felly.

In carrying out the present invention, the tire, or what may be termed the outer rim, is spaced from the felly, or is normally concentric therewith, this tire or outer rim being preferably constructed of metal. This tire is preferably provided with a rubber or other resilient tread for deadening the noise when the wheel traverses pavements or other hard surfaces. As seen in Fig. 2, the tire 7 is provided with a circumferential channel or groove to receive the rubber tread 8, this being arbitrary.

To the inner side of the tire 7 are secured a series or plurality of equally spaced blocks or bearings 9, which project inwardly, and to which are pivoted the arms or rods 10, these arms passing slidably through guides 11 secured to the periphery of the felly intermediate the bearings. The bearings 9 are disposed transversely of the tire, and terminate short of the edges of the tire, the bearings being provided with flanges 12 along their sides, which are riveted or otherwise secured to the tire, so that the bearings project inwardly and are substantial or rigid with the tire. The guides 11 are flat or weblike and are provided with flanges 13 along their sides, these flanges being riveted or otherwise secured to the inner rim 6. The guides 11 are disposed transversely of the felly and have their free edges projecting radially therefrom. Each bearing 9 is provided with a pair of spaced open slots or recesses 15 and a pair of arms 10 are pivoted to each bearing, said arms being provided with eyes 14 at their inner ends disposed in the slots 15, and a pivot pin 16 being passed through the bearing and eyes 14. The guides 11 are provided with a pair of spaced slots or elongated openings 17 through which the arms 10 pass, so as to permit the arms to swing slightly in connection with their sliding movements through the guides. The arms of each pair project in opposite directions away from each other, it being noted that the arms are disposed in chordal positions between the felly and tire, and that the complementary arms pass through the intermediate guide, so that all of the arms at one side project similarly while the other arms project in the opposite directions or approximately so.

A nut or other equivalent member 18 is screw threaded or adjustably mounted on the free end of each arm or rod 10, and a coiled wire spring 19 is disposed on each rod between the nut and the respective guide 11, these springs 19, permitting the felly and tire to oscillate relative to each other, to give relief to the tire as the vehicle is stopped, started, or accelerated in its movement, and serving to provide the quick recovery of the tire. Although these springs are provided primarily to permit oscillatory relief, they also assist in the recovery of the wheel, after the tire has been relieved vertically.

Intermediate the bearings 9, there are secured to the inner side of the tire or outer rim, a plurality or series of U-shaped yokes 20, the yokes having their intermediate portions riveted or otherwise secured to the tire or outer rim so that their arms or ends project inwardly, and said yokes being fashioned from flat strips or plates of metal. These yokes are secured to the tire opposite the guides 11, the ends of the guides being snugly slidable against the arms or ends of the yoke, so that the guides may reciprocate and oscillate within the yokes without there being a lateral displacement of either.

Between the bearings 9 and the felly or inner rim, are disposed coiled wire springs 21, while between the guides 11 and the tire or the yokes are disposed coiled wire springs 22, the said springs being primarily adapted to give vertical relief to the tire, and to provide quick, vertical recovery, although they permit oscillatory relief also. The ends of the springs 21 and 22 are preferably secured to the respective parts against which they rest in any well known manner.

In order to inclose the above described structure between the felly and the tire, and in order to assist in constraining the tire, against lateral displacement, a pair of flat rings or annular plates 23 have been disposed at the respective sides of the wheel, these plates or rings abutting against the respective ends of the bearings 9 and the yokes, and having their inner edges slidably engaging the sides of the felly. The rings 23 are riveted or otherwise secured to the arms or ends of the yokes, and the pins 16 protrude through and are preferably riveted to the rings, so that the rings are rigidly secured to the bearings and yokes and are in this manner fastened to the tire. Thus, the inner edges of the rings slidably engage the respective sides of the felly, and constrain the tire against lateral displacement, but permit the tire to reciprocate and oscillate in various directions in the plane of the wheel.

In order to prevent ingress of dust and other extraneous matter into the space between the tire and felly a packing ring 24 has been embedded in each side of the felly to contact with the inner face of the respective ring 23, these packings also serving to prevent egress or leakage of oil or other lubricant from within the space between the felly and the tire.

Any suitable means may be provided for oiling the several parts, such as is denoted generally by the numeral 25 in Fig. 1 the same being attached to one of the rings 23, in order that oil or other lubricant can be introduced. This oiling device, however, may be disposed at any suitable point.

From the foregoing, taken in connection with the drawing, it will be manifest that the wheel and tire therefor as thus provided are capable of practical use, the wheel being so constructed as to permit of vertical and oscillatory relief with quick recovery. The present invention also provides a suitable substitute for the ordinary pneumatic tire, and provides a desirable and efficient device of the character indicated.

What is claimed is:—

1. In a spring wheel, a spaced felly and tire, inwardly projecting transverse bearing blocks secured to the tire, and each having a plurality of slots, transverse webs secured to the felly intermediate the bearing blocks, the webs projecting outwardly and each having a plurality of apertures, side rings between the felly and tire, pins engaged through the bearing blocks and terminally riveted through the side rings, a plurality of chordal arms pivoted to each pin within the respective slots of the bearing blocks, the arms passing slidably through the apertures of the webs, and projecting in opposite directions, and springs disposed between the webs and arms.

2. In a spring wheel, a spaced felly and tire, U-shaped members secured to the tire with their arms projecting inwardly, outwardly projecting members secured to the felly and fitting slidably within the arms of the U-shaped members to permit the felly and tire to move in various directions in the plane of the wheel, inwardly projecting members secured to the tire intermediate the U-shaped members, yielding connections between the felly members and the last mentioned tire members, and side rings secured to the arms of the U-shaped members and slidably engaging the respective sides of the felly.

3. In a spring wheel, a spaced felly and tire, U-shaped members secured to one of the said parts with their arms projecting toward the other part, guides secured to the last mentioned part and fitting slidably between the arms of the U-shaped members, side rings secured to the arms of the U-shaped members and slidably engaging the respective sides of the last mentioned part, pins terminally riveted through the rings intermediate the U-shaped members, arms pivoted to the pins and slidable loosely through the guides, and springs disposed between the guides and arms.

4. In a spring wheel, a spaced felly and tire, U-shaped members secured to the tire with their arms projecting inwardly, outwardly projecting guides secured to the felly and fitting slidably between the arms of the respective U-shaped members, bearing blocks secured to the tire intermediate the U-shaped members, pins engaged through the bearing blocks, side rings secured to the arms of the U-shaped members and overlapping the sides of the felly, said pins having their terminals riveted through the rings, arms pivoted to the said pins and slidable loosely through the guides, and springs disposed between the guides and arms.

In testimony that we claim the foregoing as our own, we have hereto affixed our signatures in the presence of two witnesses.

GEORGE W. GRAVES.
MOSLEY McCOLLMAN.
ALEXANDER P. GIBSON.

Witnesses:
W. J. HANCOCK,
HARRY THOMPSON.

Copies of this patent may be obtained for five cents each, by addressing the "Commissioner of Patents, Washington, D. C."